US006201090B1

(12) United States Patent
Sumitomo et al.

(10) Patent No.: US 6,201,090 B1
(45) Date of Patent: Mar. 13, 2001

(54) PROPYLENE/ETHYLENE BLOCK COPOLYMER

(75) Inventors: Takashi Sumitomo; Sueto Miyazaki; Tsuyoshi Ota; Kazuo Sato, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/463,983

(22) PCT Filed: Jun. 17, 1999

(86) PCT No.: PCT/JP99/03220

§ 371 Date: Feb. 16, 2000

§ 102(e) Date: Feb. 16, 2000

(87) PCT Pub. No.: WO99/65965

PCT Pub. Date: Dec. 23, 1999

(30) Foreign Application Priority Data

Jun. 19, 1998 (JP) .................................................. 10-173621
Jun. 19, 1998 (JP) .................................................. 10-173622

(51) Int. Cl.[7] .................................................. C08F 210/00
(52) U.S. Cl. ............................................................. 526/348
(58) Field of Search .............................................. 526/348

(56) References Cited

FOREIGN PATENT DOCUMENTS

| 7-25961 | * | 1/1995 | (JP) . |
| 7-247311 | * | 9/1995 | (JP) . |
| 9-176227 | * | 7/1997 | (JP) . |

* cited by examiner

*Primary Examiner*—Edward J. Cain
(74) *Attorney, Agent, or Firm*—Oblon, Spivak, McClelland, Maier & Neustadt, P.C.

(57) ABSTRACT

Provided are propylene-ethylene block copolymers having the advantage of well-balanced physical properties of rigidity, impact resistance, etc.

The propylene-ethylene block copolymers are characterized by (a), (b), (c1), (c2) and (c3): (a) The melt flow rate falls between 0.01 and 1000 g/10 min. (b) The room-temperature xylene-insoluble component has an [mmmm] fraction of not smaller than 98.9%. (c1) The amount of the room-temperature xylene-soluble component falls between 3 and 50% by weight. (c2) The T1 relaxation time component in pulse NMR is of a single relaxation component. (c3) The ethylene content, x % by weight, as measured through $^{13}$C-NMR, and the T1 relaxation time satisfy $y \leqq 0.0014x^3 - 0.0897x^2 - 1.0593x + 231.6$.

The block copolymers may be characterized by (a), (b), (c1) and (c4): (a) The melt flow rate falls between 0.01 and 1000 g/10 min. (b) The room-temperature xylene-insoluble component has an [mmmm] fraction of not smaller than 98.9%. (c1) The amount of the room-temperature xylene-soluble component falls between 3 and 50 % by weight. (c4) The ethylene content, x% by weight, and the ratio by weight of the crystalline polyethylene segments to the total of the ethylene-propylene copolymer segments and the crystalline polyethylene segments, z (%), as obtained from the TEM (transmission electron microscope) image of the propylene-ethylene block copolymers, satisfy $2 \leqq 0.016x^2 - 0.069x - 1.34$.

10 Claims, 4 Drawing Sheets

PROPYLENE/ETHYLENE BLOCK COPOLYMER

BACKGROUND OF THE INVENTION

1. Field of the Invention

The present invention relates to a propylene-ethylene block copolymer in which ethylene-propylene copolymer segments of a uniform rubber-like elastomer component are dispersed in the matrix of propylene homopolymer segments having high stereospecificity. Precisely, the invention relates to a propylene-ethylene block copolymer which is characterized in that ethylene-propylene copolymer segments of not a mixture of plural rubber-like elastomers each having a different degree of hardness but a uniform rubber-like elastomer component are dispersed in the matrix of propylene homopolymer segments of that type.

The invention also relates to a propylene-ethylene block copolymer in which copolymer segments having a large proportion of ethylene-propylene copolymer fragments are dispersed in the matrix of propylene homopolymer segments having high stereospecificity. Precisely, the invention relates to a propylene-ethylene block copolymer which is characterized in that copolymer segments having a small proportion of crystalline polyethylene fragments relative to the ethylene content thereof and therefore having a large proportion of ethylene-propylene copolymer fragments relative to the same are dispersed in the matrix of propylene homopolymer segments of that type.

2. Description of the Related Art

Various studies for improving propylene-ethylene block copolymers have heretofore been made, which are specifically directed to the improvement in the physical balance of rigidity and impact resistance of the copolymers. One good approach thereto is to investigate the copolymers from the aspect of their solid structure morphology. Briefly, propylene-ethylene block copolymers are composed of propylene homopolymer segments that constitute the matrix of the copolymers and ethylene-propylene copolymer segments of a rubber-like elastomer dispersed in the matrix. To improve their properties, the influence of the solid structure of the copolymers on the strength characteristic thereof is first analyzed for various factors of the copolymers, including the proportion of the constituent segments thereof, and also the molecular weight and the stereospecificity of each constituent segment, and thereafter the thus-analyzed data are reflected on polymer designing and are further fed back to the technique of producing the intended polymers.

As a result of various studies to that effect, it has be en clarified that, in propylene-ethylene copolymers, the molecular weight of the ethylene-propylene copolymer segments constituting the rubber-like elastomer component has governing influences on the physical balance of rigidity and impact resistance of the copolymers.

In that situation, however, it is further desired to develop propylene-ethylene block copolymers having more improved impact resistance.

SUMMARY OF THE INVENTION

The object of the present invention is to provide propylene-ethylene block copolymers having an improved physical balance of rigidity and impact resistance.

We, the present inventors have assiduously studied for the purpose of attaining the object as above, and have completed the invention. Specifically, the invention is to provide propylene-ethylene block copolymers mentioned below.

[1] A propylene-ethylene block copolymer characterized by the following (a), (b) and (c):

(a) its melt flow rate (MFR) (at 230° C. under a load of 2.16 kg) falls between 0.01 and 1000 g/10 min;

(b) the room-temperature xylene-insoluble component thereof, as measured through $^{13}$C-NMR, has a stereospecificity index [mmmm] fraction of not smaller than 98.9%; and (c) the room-temperature xylene-soluble component thereof is characterized by the following (c1), (c2) and (c3):

(c1) its amount falls between 3 and 50% by weight;

(c2) the T1 relaxation time component thereof, as measured through pulse NMR, is of a single relaxation component; and (c3) the ethylene content thereof, x % by weight, as measured through $^{13}$C-NMR, and the T1 relaxation time for it, y (milliseconds), as measured through pulse NMR, satisfy the following relational formula (I):

$$y \leq 0.0014x^3 - 0.0897x^2 - 1.0593x + 231.6 \quad \text{(I).}$$

[2] The propylene-ethylene block copolymer of above [1], of which the melt flow rate (MFR) (at 230° C. under a load of 2.16 kg) falls between 0.3 and 300 g/10 min.

[3] The propylene-ethylene block copolymer of above [2], which is produced through polymerization in the presence of a catalyst that comprises (A) a solid catalyst component formed from (a) a magnesium compound, (b) a titanium compound, (c) an electron donor, and optionally (d) a silicon compound, (B) an organoaluminium compound, and optionally (C) the third component of an electron-donating compound.

[4] The propylene-ethylene block copolymer of above [2], which is produced through polymerization in the presence of a catalyst that comprises (A) a solid catalyst component as prepared by contacting (a) a magnesium compound and (b) a titanium compound with each other in the presence of (c) an electron donor, at a temperature falling between 120 and 150° C., followed by washing them with an inert solvent at a temperature falling between 100 and 150° C., (B) an organoaluminium compound, and (C) the third component of an electron-donating compound.

[5] The propylene-ethylene block copolymer of above [2], which is produced through polymerization in the presence of a catalyst that comprises (A) a solid catalyst component as prepared by contacting (a) a magnesium compound and (b) a titanium compound with each other in the presence of (c) an electron donor and (d) a silicon compound, at a temperature falling between 120 and 150° C., followed by washing them with an inert solvent at a temperature falling between 100 and 150° C., (B) an organoaluminium compound, and (C) the third component of an electron-donating compound.

[6] A propylene-ethylene block copolymer characterized by the following (a), (b) and (c'):

(a) its melt flow rate (MFR) (at 230° C. under a load of 2.16 kg) falls between 0.01 and 1000 g/10 min;

(b) the room-temperature xylene-insoluble component thereof, as measured through $^{13}$C-NMR, has a stereospecificity index [mmmm] fraction of not smaller than 98.9%; and (c') the room-temperature xylene-soluble component thereof is characterized by the following (c1) and (c4):

(c1) its amount falls between 3 and 50% by weight; and (c4) the ethylene content thereof, x % by weight, as measured through $^{13}$C-NMR, and the ratio by weight of the crystalline polyethylene segments to the total of the ethylene-propylene copolymer segments and the crystalline polyethylene segments, z (%), as obtained from the TEM (transmission electron microscope) image of the propylene-ethylene block copolymer, satisfy the following relational formula (II):

$$z \leq 0.016x^2 - 0.069x - 1.34 \tag{II}$$

[7] The propylene-ethylene block copolymer of above [6], of which the melt flow rate (MFR) (at 230° C. under a load of 2.16 kg) falls between 0.3 and 300 g/10 min.

[8] The propylene-ethylene block copolymer of above [7], which is produced through polymerization in the presence of a catalyst that comprises (A) a solid catalyst component formed from (a) a magnesium compound, (b) a titanium compound, (c) an electron donor, and optionally (d) a silicon compound, (B) an organoaluminium compound, and optionally (C) the third component of an electron-donating compound.

[9] The propylene-ethylene block copolymer of above [7], which is produced through polymerization in the presence of a catalyst that comprises (A) a solid catalyst component as prepared by contacting (a) a magnesium compound and (b) a titanium compound with each other in the presence of (c) an electron donor, at a temperature falling between 120 and 150° C., followed by washing them with an inert solvent at a temperature falling between 100 and 150° C., (B) an organoaluminium compound, and (C) a third component of an electron-donating compound.

[10] The propylene-ethylene block copolymer of above [7], which is produced through polymerization in the presence of a catalyst that comprises (A) a solid catalyst component as prepared by contacting (a) a magnesium compound and (b) a titanium compound with each other in the presence of (c) an electron donor and (d) a silicon compound, at a temperature falling between 120 and 150° C., followed by washing them with an inert solvent at a temperature falling between 100 and 150° C., (B) an organoaluminium compound, and (C) a third component of an electron-donating compound.

DETAILED DESCRIPTION OF THE INVENTION

Figure 1:
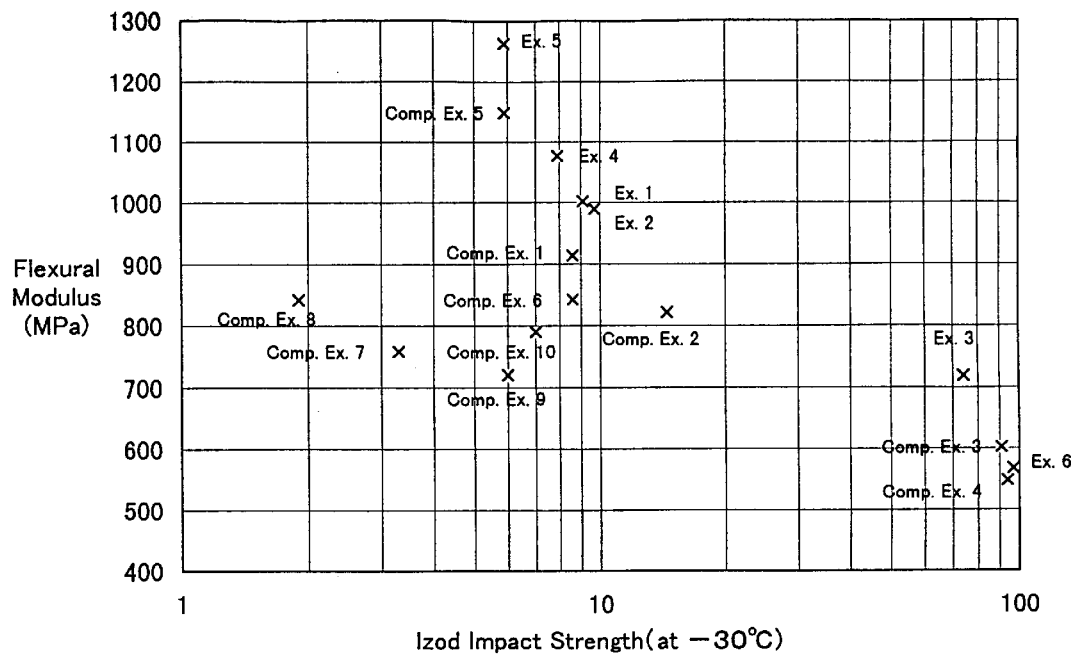
FIG. 1 shows the flexural modulus versus the Izod impact strength (at −30° C.) of the samples in Examples 1 to 6 and Comparative Examples 1 to 10.

The invention is described in detail hereinunder.

Propylene-ethylene block copolymers:

The propylene-ethylene block copolymers of the invention are compositions comprising, as the essential components, a propylene homopolymer, an ethylene-propylene copolymer and an ethylene homopolymer, and are typically produced through propylene-ethylene block copolymerization, but are not limited thereto. They may be blends as produced by blending the constituent polymer components.

The propylene-ethylene block copolymers of the invention are grouped into two, a propylene-ethylene block copolymer (I) of which the room-temperature xylene-soluble component satisfies the constitutional requirements (c1), (c2) and (c3), and a propylene-ethylene block copolymer (II) of which the room-temperature xylene-soluble component satisfies the constitutional requirements (c1) and (c4).

The most significant feature of the propylene-ethylene block copolymer (I) of the invention is that the ethylene-propylene copolymer segments therein are of a uniform rubber-like elastomer with which, therefore, the impact resistance of the copolymer (I) is much improved while the rigidity and other physical properties thereof are not worsened.

On the other hand, the most significant feature of the propylene-ethylene copolymer (II) of the invention is that the crystalline polyethylene content thereof is small relative to the total of the ethylene-propylene copolymer segments and the crystalline polyethylene segments constituting the copolymer (II). As being so characterized, therefore, the low-temperature impact resistance of the copolymer (II) is much improved while the rigidity thereof is not lowered.

The propylene-ethylene block copolymers of the invention have a melt flow rate (MFR) (at 230° C. under a load of 2.16 kg) falling between 0.01 and 1000 g/10 min, preferably between 0.3 and 300 g/10 min. If their MFR is smaller than 0.01 g/10 min, the copolymers are difficult to mold; but if larger than 1000 g/10 min, the physical properties, including the rigidity and the impact resistance, of the moldings of the compositions are not good.

The propylene-ethylene block copolymers of the invention are further characterized in that the room-temperature xylene-insoluble component thereof has a stereospecificity index [mmmm] fraction, as measured through $^{13}$C-NMR, of not smaller than 98.9%.

The method of $^{13}$C-NMR for analyzing the room-temperature xylene-insoluble component of the block copolymers is described in detail hereinunder.

In the block copolymers, the room-temperature xylene-insoluble component essentially comprises propylene homopolymer segments, and its stereospecificity index [mmmm] fraction to be measured according to the method is referred to as an isotactic pentad fraction, and this indicates the proportion of five propylene monomer units as meso-bonded in series to all propylene monomer units constituting the polypropylene molecular chains in each block copolymer. Therefore, a higher value of the isotactic pentad fraction in question indicates that the proportion of the polypropylene segments having an isotactic structure in the block copolymer is higher. If the stereospecificity index [mmmm] fraction therein is smaller than 98.9%, the block copolymers are not good as their rigidity, surface hardness and heat resistance are low.

Of the propylene-ethylene block copolymers of the invention, the amount of the room-temperature xylene-soluble component must be from 3 to 50% by weight.

Of the block copolymers, the room-temperature xylene-soluble component essentially comprises ethylene-propylene copolymer segments. If the amount of the soluble component is smaller than 3% by weight, the block copolymers are not good as their impact resistance is low; but if larger than 50% by weight, the block copolymers are also not good as their rigidity, surface hardness and heat resistance are low.

Of the propylene-ethylene block copolymer (I) of the invention, the room-temperature xylene-soluble component must be such that the T1 relaxation time component thereof, as measured through pulse NMR, is of a single relaxation component, and that the ethylene content thereof, x % by weight, as measured through $^{13}$C-NMR, and the T1 relaxation time for it, y (milliseconds), as measured through pulse NMR, satisfy the following relational formula (I):

$$y \leq 0.0014x^3 - 0.0897x^2 - 1.0593x + 231.6 \qquad (I).$$

Of the block copolymer (I), the room-temperature xylene-soluble component essentially comprises ethylene-propylene copolymer segments but does not contain crystalline polyethylene.

The method for analyzing the room-temperature xylene-soluble component of the block copolymer (I) for measuring the T1 relaxation time through pulse NMR is described in detail hereinunder. The technical meaning of the analysis is as follows: A sample to be analyzed is exposed to an electromagnetic wave at a predetermined frequency for pulse irradiation thereto, by which the nuclear magnetic moment of the sample is excited. The time necessary for restoring the thus-excited sample to its original condition indicates the molecular mobility of the sample. A smaller value of the T1 relaxation time for the sample measured corresponds to a lower frequency region for the molecular motion of the sample. Where different samples all having the same amount of a room-temperature xylene-soluble component are analyzed for the T1 relaxation time, those for which the value of the T1 relaxation time measured is smaller have a higher degree of impact resistance. This suggests that the time scale for the measurement in the impact strength test is substantially correlated with the frequency region for the pulse irradiation. Concretely, as in Tables 1 and 2 shown hereinunder, the T1 relaxation time is represented by a unit on the order of milliseconds. Therefore, it is suggested that, when an impact is applied to a sample, the time to be taken while the sample begins to fracture and is finally fractured could be also represented by a unit on the order of milliseconds.

The T1 relaxation time component of being a single component in the block copolymer (I) means that the component is substantially a uniform component. Precisely, the formula (I) means that the frequency region for the molecular motion in the ethylene-propylene copolymer segments in the block copolymer (I) is low, relative to the ethylene concentration therein, and that the ethylene-propylene copolymer segments are of a rubber-like elastomer of a substantially single component.

The T1 relaxation time for a sample of the block copolymer (I) is represented as follows: The data of the sample, $\ln\{M(\infty)-M(\tau)\}$, are plotted on a diagram of coordinates in which the horizontal axis indicates the varying time $\tau$ (180° pulse and 90° pulse irradiation time interval) and the vertical axis indicates the signal intensity $M(\tau)$ after 90° pulse irradiation to the sample. The thus-plotted line declines to lower points in the direction of the horizontal axis. The T1 relaxation time for the sample is represented by the minus reciprocal of the inclination of that line. With the T1 relaxation time for the sample being smaller, the plotted line declines more greatly, and the signal intensity $M(\tau)$ attenuates within a shorter period of time. If the sample having been analyzed in that manner gives a plurality of differently declining lines on the coordinates, it comprises a plurality of components. Therefore, samples of a single component shall give a single declining line each on the coordinates.

When the room-temperature xylene-soluble component of a propylene-ethylene block copolymer is analyzed through pulse NMR for the T1 relaxation time component as above, and if the resulting T1 relaxation time component from the block copolymer is not a single component, the impact strength of the block copolymer is low. In addition, if the room-temperature xylene-soluble component of the block copolymer does not satisfy the formula (I), the impact strength of the block copolymer is also low.

The propylene-ethylene block copolymer (I) of the invention is a high-quality polymer heretofore unknown in the art, and its physical properties are well balanced on a high level. Specifically, the balance of the rigidity and the impact strength of the block copolymer (I), the balance of the Rockwell hardness and the impact strength thereof, and the balance of the heat distortion temperature and the impact strength thereof are all good.

The propylene-ethylene block copolymer (II) of the invention satisfies all the requirements for its MFR, the stereospecificity of the room-temperature xylene-insoluble component thereof, and the amount of the room-temperature xylene-soluble component thereof. In addition, the room-temperature xylene-soluble component of the block copolymer (II) further satisfies the following relational formula (II):

$$z \leq 0.016x^2 - 0.069x - 1.34 \qquad (II),$$

wherein x (%) indicates the ethylene content of the room-temperature xylene-soluble component as measured through $^{13}$C-NMR; and z (%) indicates the ratio by weight of the crystalline polyethylene segments to the total of the ethylene-propylene copolymer segments and the crystalline polyethylene segments, as obtained from the TEM (transmission electron microscope) image of the propylene-ethylene block copolymer (II).

The method for measuring the ethylene content of the room-temperature xylene-soluble component through $^{13}$C-NMR, and the method for measuring the ratio by weight of the crystalline polyethylene segments to the total of the ethylene-propylene copolymer segments and the crystalline polyethylene segments from the TEM image of the propylene-ethylene block copolymer (II) are described hereinunder.

In the propylene-ethylene block copolymer (II) of the invention, a major part of the ethylene-containing polymer segments are of a rubber-like elastomer (of an ethylene-propylene copolymer), as so mentioned hereinabove, and therefore, the crystalline polyethylene content of the ethylene-containing polymer segments in the block copolymer (II) is small. The formula (II) indicates the significant feature of the block copolymer (II). If the values x and Y do not satisfy the relation of the formula (II), and if the rigidity of the block copolymer (II) is increased to a desired level, the impact resistance of the block copolymer (II) is lowered.

The propylene-ethylene block copolymer (II) of the invention is a high-quality polymer heretofore unknown in the art, and its physical properties are well balanced on a high level. Specifically, the balance of the rigidity and the impact strength of the block copolymer (II), the balance of the Rockwell hardness and the impact strength thereof, and the balance of the heat distortion temperature and the impact strength thereof are all good.

Method for producing propylene-ethylene block copolymers:

The propylene-ethylene block copolymers of the invention are not specifically limited for the method of producing them, provided that they satisfy the requirements defined herein. However, in order to obtain polymers comprising propylene homopolymer segments with high stereospecificity and having good copolymerizability with ethylene, especially those with a high molecular weight having MFR of from 0.3 to 300 g/10 min or so, using Ziegler catalysts is rather preferred to using metallocene catalysts. Concretely, for example, used is a catalyst that comprises (A) a solid catalyst component formed from (a) a titanium compound, (b) a magnesium compound, (c) an electron donor, and optionally (d) a silicon compound, (B) an organoaluminium compound, and optionally (C) the third component of an electron-donating compound. In the presence of the catalyst of that type, the block copolymers of the invention may be produced through polymerization. Especially preferably, the solid catalyst component for the catalyst for use in the invention is prepared by contacting a magnesium compound and a titanium compound with each other in the presence of an electron donor and optionally a silicon compound, at a temperature falling between 120 and 150° C., followed by washing them with an inert solvent at a temperature falling between 100 and 150° C.

The catalyst components, the method for producing the catalyst, and the method for polymerization to produce the block copolymers of the invention are described below.

[I] Catalyst components:

(A) Solid catalyst component:

The solid catalyst component is formed from (a) a titanium compound, (b) a magnesium compound, (c) an electron donor, and optionally (d) a silicon compound, which are as follows:

(a) Titanium compound:

Though not specifically defined, titanium compounds of the following general formula (III) are preferably used in the invention:

$$TiX^1_p(OR^1)_{4-p} \quad (III).$$

In formula (III), $X^1$ represents a halogen atom, and is preferably a chlorine or bromine atom. More preferred is a chlorine atom. $R^1$ represents a hydrocarbon group, which may be saturated or unsaturated, and may be linear, branched or cyclic. It may contain hetero atoms of sulfur, nitrogen, oxygen, silicon, phosphorus, etc., but is preferably a hydrocarbon group having from 1 to 10 carbon atoms, more preferably an alkyl, alkenyl, cycloalkenyl, aryl or aralkyl group, even more preferably a linear or branched alkyl group. Plural —$OR^1$s, if any, may be the same or different. Specific examples of $R^1$ include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group and a phenethyl group, etc. p is an integer of from 0 to 4.

Specific examples of the titanium compounds of formula (III) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium and tetraphenoxytitanium, etc; titanium tetrahalides such as titanium tetrachloride, titanium tetrabromide and titanium tetraiodide, etc; alkoxytitanium trihalides such as methoxytitanium trichloride, ethoxytitanium trichloride, propoxytitanium trichloride, n-butoxytitanium trichloride and ethoxytitanium tribromide, etc; dialkoxytitanium dihalides such as dimethoxytitanium dichloride, diethoxytitanium dichloride, diisopropoxytitanium dichloride, di-n-propoxytitanium dichloride and diethoxytitanium dibromide, etc; trialkoxytitanium monohalides such as trimethoxytitanium chloride, triethoxytitanium chloride, triisopropoxytitanium chloride, tri-n-propoxytitanium chloride and tri-n-butoxytitanium chloride, etc. Of those, preferred are high-halogen titanium compounds in view of the polymerization activity of the catalyst, and especially preferred is titanium tetrachloride. One or more of these titanium compounds may be used either singly or as combined.

(b) Magnesium compound:

Though not specifically defined, magnesium compounds of the following formula (IV) are preferably used in the invention.

$$MgR^2R^3 \quad (IV)$$

In formula (IV), $R^2$ and $R^3$ each represent a hydrocarbon group, an $OR^4$ group (where $R^4$ indicates a hydrocarbon group), or a halogen atom. More precisely, the hydrocarbon group for $R^2$ and $R^3$ may be an alkyl, cycloalkyl, aryl or aralkyl group having from 1 to 12 carbon atoms. In $OR^4$, $R^4$ represents an alkyl, cycloalkyl, aryl or aralkyl group having from 1 to 12 carbon atoms. The halogen atom includes chlorine, bromine, iodine and fluorine atoms. $R^2$ and $R^3$ may be the same or different.

Specific examples of the magnesium compounds of formula (IV) include alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium and dicyclohexylmagnesium, etc; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium and dicyclohexyloxymagnesium, etc; alkylmagnesium halides and arylmagnesium halides such as ethylmagnesium chloride, butylmagnesium chloride, hexylmagnesium chloride, isopropylmagnexium chloride, isobutylmagnesium chloride, t-butylmagnesium chloride, phenylmagnesium bromide, benzylmagnesium chloride, ethylmagnesium bromide, butylmagnesium bromide, phenylmagnesium chloride and butylmagnesium iodide, etc; alkoxymagnesium halides and aryloxymagnesium halides such as butoxymagnesium chloride, cyclohexyloxymagnesium chloride, phenoxymagnesium chloride, ethoxymagnesium bromide, butoxymagnesium bromide and ethoxymagnesium iodide, etc; magnesium halides such as magnesium chloride, magnesium bromide and magnesium iodide, etc.

Of those magnesium compounds, preferred are magnesium halides, alkoxymagnesiums, alkylmagnesiums, and alkylmagnesium halides, in view of the polymerization activity and the stereospecificity of the catalyst.

The magnesium compounds may be prepared from metal magnesium or from magnesium-containing compounds.

One example of preparing the magnesium compounds comprises contacting metal magnesium with a halogen and an alcohol. The halogen includes iodine, chlorine, bromine and fluorine. Of those, preferred is iodine. The alcohol includes, for example, methanol, ethanol, propanol, butanol and octanol.

Another example of preparing the magnesium compounds comprises contacting a magnesium alkoxide of $Mg(OR^6)^2$ (where $R^6$ indicates a hydrocarbon group having from 1 to 20 carbon atoms) with a halide.

The halide includes, for example, silicon tetrachloride, silicon tetrabromide, tin tetrachloride, tin tetrabromide, hydrogen chloride, etc. Of those, preferred is silicon tetrachloride in view of the polymerization activity and the stereospecificity of the catalyst. $R^6$ includes, for example, an alkyl group such as a methyl group, an ethyl group, a propyl group, an isopropyl group, a butyl group, an isobutyl group, a hexyl group and an octyl group, etc; a cyclohexyl group; an alkenyl group such as an allyl group, a propenyl group and a butenyl group, etc; an aryl group such as a phenyl group, a tolyl group and a xylyl group, etc; and an aralkyl group such as aphenethyl group and a 3-phenylpropyl group, etc. Of those, especially preferred are alkyl groups having from 1 to 10 carbon atoms.

As the magnesium alkoxides, mentioned are alkoxymagnesiums and aryloxymagnesiums as above. Of those, preferred is diethoxymagnesium.

One or more of the magnesium compounds as above may be used herein, either singly or as combined. The magnesium compounds may be held on a support of, for example, silica, alumina, polystyrene or the like, or may be combined with halogens, etc.

(c) Electron donor:

The electron donor for use herein includes oxygen-containing electron donors such as alcohols, phenols, ketones, aldehydes, carboxylic acids, malonic acid, esters of organic acids or inorganic acids, ethers such as monoethers, diethers or polyethers, etc; and nitrogen-containing electron donors suchas ammonia, amines, nitriles, isocyanates, etc. Of those, preferred are polycarboxylates, and more preferred are aromatic polycarboxylates. In view of the polymerization activity of the catalyst, even more preferred are monoesters and diesters of aromatic dicarboxylic acids. Also preferred are those esters in which the organic group in the ester moiety is a linear, branched or cyclic aliphatic hydrocarbon residue.

Concretely mentioned are dialkyl esters of dicarboxylic acids such as phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid, indane-5,6-dicarboxylic acid, etc., in which the alkyl group may be any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethylbutyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-ethylpentyl, and 3-ethylpentyl groups. Of those, preferred are diphthalates.

Preferred examples of the diphthalates include di-n-butyl phthalate, diisobutyl phthalate, di-n-heptyl phthalate and diethyl phthalate, etc. One or more of these compounds may be used either singly or as combined.

(d) Silicon compound:

In preparing the solid catalyst component, if desired, a silicon compound of the following general formula (V) may be used as the component (d), in addition to the above components (a), (b) and (c).

$$Si(OR^7)_q X^3_{4-q} \qquad (V).$$

With the silicon compound, the activity and the stereospecificity of the catalyst could be improved, and, in addition, the amount of fine powder that may be in the polymers produced could be reduced.

In formula (V), $X^3$ represents a halogen atom, and is preferably a chlorine or bromine atom, more preferably a chlorine atom. $R^7$ represents a hydrocarbon group, which may be saturated or unsaturated, and may be linear, branched or cyclic. It may contain hetero atoms of sulfur, nitrogen, oxygen, silicon and phosphorus, etc, but is preferably a hydrocarbon group having from 1 to 10 carbon atoms, more preferably an alkyl, alkenyl, cycloalkyl, aryl or aralkyl group. Plural —$OR^7$'s, if any, may be the same or different. Specific examples of $R^7$ include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group and a phenethyl group, etc. q is an integer of from 0 to 3.

Specific examples of the silicon compounds of formula (V) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane and tripropoxychlorosilane, etc. Of those, preferred is silicon tetrachloride. One or more of these silicon compounds may be used either singly or as combined.

(B) Organoaluminium compound:

Though not specifically defined, organoaluminium compounds to be used in the invention as the component (B) are preferably those containing any of alkyl groups, halogen atoms, hydrogen atoms, and alkoxy groups, as well as aluminoxanes and their mixtures. Concretely, they include trialkylaluminiums such as trimethylaluminium, triethylaluminium, triisopropylaluminium, triisobutylaluminium and trioctylaluminium, etc; dialkylaluminium monochlorides such as diethylaluminium monochloride, diisopropylaluminium monochloride, diisobutylaluminium monochloride and dioctylaluminium monochloride, etc; alkylaluminium sesqui-halides such as ethylaluminium sesqui-chloride, etc; linear aluminoxanes such as methylaluminoxane, etc. Of those organoaluminium compounds, preferred are trialkylaluminiums with lower alkyl groups each having from 1 to 5 carbon atoms; and especially preferred are trimethylaluminium, triethylaluminium, tripropylaluminium, and triisobutylaluminium. One or more of these organoaluminium compounds may be used either singly or as combined.

(C) Third component (electron-donating compound):

In producing the polymers of the invention, optionally added to the polymerization system is an electron-donating compound as the third component (C). The electron-donating compound for the component (C) includes organosilicon compounds with Si-O-C bond, nitrogen-containing compounds, phosphorus-containing compounds, and oxygen-containing compounds. Of those, preferred are organosilicon compounds with Si-O-C bond, ethers and esters, in view of the polymerization activity and the stereospecificity of the catalyst; and especially preferred are organosilicon compounds with Si-O-C bond.

Specific examples of the organosilicon compounds with Si-O-C bond include tetramethoxysilane, tetraethoxysilane, tetrabutoxysilane, tetraisobutoxysilane, trimethylmethoxysilane, trimethylethoxysilane, triethylmethoxysilane, triethylethoxysilane, ethylisopropyldimethoxysilane, n-propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, butylethyldimethoxysilane, t-butylpropyldimethoxysilane, t-butylisopropyldimethoxysilane, t-butylbutyldimethoxysilane, t-butylisobutyldimethoxysilane, t-butyl (s-butyl) dimethoxysilane, t-butylamyldimethoxysilane, t-butylhexyldimethoxysialne, t-butylheptyldimethoxysilane, t-butyloctyldimethoxysilane, t-butylnonyldimethoxysilane, t-butyldecyldimethoxysilane, t-butyl(3,3,3-trifluoromethylpropyl) dimethoxysilane, cyclohexylmethyldimethoxysiilane, cyclohexylethyldimethoxysilane, cyclohexylpropyldimethoxysilane, cyclohexylisobutyldimethoxysilane, cyclopentyl-t-butyldimethoxysilane, cyclohexyl-t-butyldimethoxysilane, dicyclopentyldimethoxysilane, dicyclohexyldimethoxysilane, bis(2-methylcyclopentyl) dimethoxysilane, bis( 2,3-dimethylcyclopentyl) dimethoxysilane, diphenyldimethoxysilane, phenyltriethoxysilane, methyltriethoxysilane, ethyltriethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornanetrimethoxysilane, indenyltrimethoxysilane, 2-methylcyclopentyltrimethoxysilane, cyclopentyl(t-butoxy) dimethoxysilane, isopropyl(t-butoxy) dimethoxysilane, t-butyl(isobutoxy)dimethoxysilane, t-butyl(t-butoxy)dimethoxysilane, thexyltrimethoxysilane, thexylisopropoxydimethoxysilane, thexyl(t-butoxy) dimethoxysilane, thexylmethyldimethoxysilane, thexylethyldimethoxysilane, thexylisopropyldimethoxysilane, thexylcyclopentyldimethoxysilane, thexylmyristyldimethoxysilane, thexylcyclohexyldimethoxysilane, 1,1-dimethoxy-2,6-dimethyl-1-silasiloxane, etc. One of more of these organosilicon compounds may be used either singly or as combined.

Of those organosilicon compounds, preferred are dimethoxysilanes such as diisopropyldimethoxysilane, diisobutyldimethoxysilane, t-butylmethyldimethoxysilane, cyclohexylmethyldimethoxysilane, cyclohexylisobutyldimethoxysilane, dicyclopentyldimethoxysilane, and 1,1-dimethoxy-2,6-dimethyl-1-silasiloxane. Especially preferred are 1,1-dimethoxy-2,6-dimethyl-1-silasiloxane, dicyclopentyldimethoxysilane, and cyclohexylisobutyldimethoxysilane.

Specific examples of the nitrogen-containing compounds include 2,6-substituted piperidines such as 2,6-diisopropylpiperidine, 2,6-diisopropyl-4-methylpiperidine, N-methyl-2,2,6,6-tetramethylpiperidine, etc; 2,5-substituted azolidines such as 2,5-diisopropylazolidine, N-methyl-2,2, 5,5-tetramethylazolidine, etc; substituted methylenediamines such as N,N,N',N'-tetramethylmethylenediamine, N,N,N',N'-tetraethylmethylenediamine, etc.; substituted imidazolidines such as 1,3-dibenzylimidazolzidine, 1,3-dibenzyl-2-phenylimidazolidine, etc.

Specific examples of the phosphorus-containing compounds include phosphites such as triethyl phosphite, tri-n-propyl phosphite, triisopropyl phosphite, tri-n-butyl phosphite, triisobutyl phosphite, diethyl-n-butyl phosphite, diethylphenyl phosphite, etc.

Specific examples of the oxygen-containing compounds include 2,6-substituted tetrahydrofurans such as 2,3,6,6-tetramethyltetrahydrofuran, 2,2,6,6-tetraethyltetrahydrofuran, etc; dimethoxymethane derivatives such as 1,1-dimethoxy-2,3,4,5-tetrachlorocyclopentadiene, 9,9-dimethoxyfluorene, diphenyldimethoxymethane, etc.

[II] Preparation of solid catalyst component:

To prepare the solid catalyst component (A), the above (a) titanium compound, (b) magnesium compound, (c) electron donor and optionally (d) silicon compound are contacted with each other in any ordinary manner except the temperature at which they are contacted with each other, and the order of contacting them is not specifically defined. For example, the components may be contacted with each other in the presence of an inert solvent of, for example, hydrocarbons; or they may be previously diluted with an inert solvent of, for example, hydrocarbons, and thereafter contacted with each other. The inert solvent includes, for example, aliphatic hydrocarbons and alicyclic hydrocarbons such as octane, decane, ethylcyclohexane, etc, and their mixtures.

For the reaction, the amount of the titanium compound to be used falls generally between 0.5 and 100 mols, but preferably between 1 and 50 mols, relative to one mol of magnesium in the magnesium compound to be reacted therewith. If the molar ratio oversteps the defined range, the activity of the catalyst to be prepared will be poor. The amount of the electron donor for the reaction falls generally between 0.01 and 10 mols, but preferably between 0.05 and 1.0 mol, relative to one mol of magnesium in the magnesium compound to be reacted therewith. If the molar ratio oversteps the defined range, the activity and the stereospecificity of the catalyst to be prepared will be poor.

The amount of the silicon compound, if used, may fall generally between 0.001 and 100 mols, but preferably between 0.005 and 5.0 mols, relative to one mol of magnesium in the magnesium compound to be reacted therewith. If the molar ratio oversteps the defined range, the activity and the stereospecificity of the catalyst to be prepared could not be well improved, and, in addition, the amount of fine powder in the polymers to be produced will increase.

For preparing the solid catalyst component for use in the invention, it is desirable to blend the compounds (a), (b) and (c), or the compounds (a), (b), (c) and (d), at a temperature falling between 120 and 150° C., preferably between 125 and 140° C., so that the compounds could be contacted with each other at that temperature. If the temperature at which the compounds are contacted with each other oversteps the defined range, the activity and the stereospecificity of the catalyst to be prepared could not be improved satisfactorily. The time for which the compounds are contacted with each other at that temperature generally falls between 1 minute and 24 hours, preferably between 10 minutes and 6 hours. The pressure for the contacting reaction varies, depending on the type of the solvent, if used, and on the time at which the compounds are contacted with each other, but may fall generally between 0 and 50 kg/cm$^2$G, preferably between 0 and 10 kg/cm$^2$G. During the contacting operation, it is desirable to agitate the compounds being contacted with each other, for ensuring uniform contact and high contact efficiency.

It is also desirable to contact the titanium compound with the other compounds repeatedly twice or more at a temperature falling between 120 and 150° C., whereby the titanium compound could be fully held on the magnesium compound serving as a catalyst carrier.

The amount of the solvent, if used, for the contacting operation may be generally up to 5000 ml, preferably falling between 10 and 1000 ml, relative to one mol of the titanium compound. If the ratio of the solvent used oversteps the defined range, uniform contact could not be effected or, as the case may be, the contact efficiency will be lowered.

It is desirable that the solid catalyst component having been prepared through the contacting operation as above is washed with an inert solvent at a temperature falling generally between 100 and 150° C., preferably between 120 and 140° C. If the washing temperature oversteps the defined range, the activity and the stereospecificity of the catalyst to be prepared could not be fully improved. The inert solvent includes, for example, aliphatic hydrocarbons such as octane, decane, etc.; alicyclic hydrocarbons such as methylcyclohexane, ethylcyclohexane, etc.; aromatic hydrocarbons such as toluene, xylene, etc.; halogenohydrocarbons such as tetrachloroethane, chlorofluorohydrocarbons, etc.; and their mixtures. Of those, preferred are aliphatic hydrocarbons.

The washing method is not specifically defined, for which preferred is decantation, filtration or the like. The amount of the inert solvent to be used, the washing time, and the number of washing repetitions are not also specifically defined. For example, in one washing operation, from 100 to 100000 ml, preferably from 1000 to 50000 ml of the solvent is used relative to one mol of the magnesium compound used. In general, one washing operation takes 1 minute to 14 hours, preferably 10 minutes to 6 hours. If the amount of the washing solvent to be used and the washing time overstep the defined ranges, the solid catalyst component prepared will be washed insufficiently.

The pressure for the washing operation varies, depending on the type of the solvent used and on the washing temperature, but may fall generally between 0 and 50 $kg/cm^2G$, preferably between 0 and 10 $kg/cm^2G$. During the washing operation, it is desirable to agitate the system so as to ensure uniform washing and high washing efficiency.

Preferably, the washing is repeated at least 5 times for ensuring the favorable result.

The solid catalyst component prepared may be stored in dry, or in an inert solvent of, for example, hydrocarbons and the like.

[III] Polymerization:

In the invention, the amount of the catalyst components to be used for polymerization is not specifically defined. For example, the solid catalyst component (A) may be used generally in an amount of from 0.00005 to 1 mmol in terms of the titanium atom therein, per one liter of the reaction capacity; and the amount of the organoaluminium compound (B) may be so controlled that the atomic ratio of aluminium/titanium falls generally between 1 and 1000, preferably between 10 and 500. If the atomic ratio oversteps the defined range, the catalyst activity will be low. Where an organosilicon compound or the like is used as the electron-donating compound for the third component (C), its amount may be so controlled that the molar ratio of electron-donating compound (C)/organoaluminium compound (B) falls generally between 0.001 and 5.0, preferably between 0.01 and 2.0, more preferably between 0.05 and 1.0. If the molar ratio oversteps the defined range, the activity and the stereospecificity of the catalyst will be poor. However, if the monomers are pre-polymerized, the amount of the electron-donating compound to be used could be reduced more.

For propylene-ethylene block copolymerization to produce the block copolymers of the invention, if desired, propylene may be pre-polymerized prior to the final polymerization of the monomers. This is for ensuring the polymerization activity of the catalyst used, and ensuring the stereospecificity of the block copolymers produced, and for reducing the amount of fine powdery polymer products that may be formed during the copolymerization. For example, propylene is pre-polymerized in the presence of a catalyst as prepared by blending the solid catalyst component (A), the organoaluminium compound (B) and optionally the electron-donating compound (C) in a pre-determined ratio, at a temperature generally falling between 1 and 100° C. and under a pressure generally falling ordinary pressure and 50 $kg/cm^2G$ or so, and thereafter propylene and ethylene are finally polymerized in the presence of the resulting prepolymer and the catalyst. The mode of the final polymerization is not specifically defined, for which is employable any of solution polymerization, slurry polymerization, gas-phase polymerization, bulk polymerization, etc. The final polymerization may be effected in any mode of batch polymerization or continuous polymerization. As the case may be, two-stage or more multi-stage polymerization in which the plural stages are effected under different conditions may apply thereto.

In any of batch polymerization or continuous polymerization for the method of producing the block copolymers of the invention, propylene is first homopolymerized to form the propylene homopolymer segments, and then copolymerized with ethylene to form the copolymer segments.

For continuous polymerization to produce the block copolymers of the invention, for example, starting propylene gas, hydrogen gas serving as a molecular weight-controlling agent, and a catalyst such as that noted above are fed into a polymerization reactor in the former stage, and the propylene monomer is homopolymerized in the reactor to form the propylene homopolymer segments. In this stage, the degree of polymerization is controlled by controlling the polymerization time. Next, the propylene homopolymer thus formed is transferred into a polymerization reactor in the latter stage, to which are added propylene gas to be further polymerized, a comonomer of ethylene, hydrogen gas, and optionally a catalyst such as that noted above. In the latter stage polymerization reactor in that condition, the propylene homopolymer is further polymerized with the monomers added to form the copolymer segments. Thus is finally produced the intended block copolymer.

Regarding the reaction conditions, the polymerization pressure is not specifically defined, but may fall generally between atmospheric pressure and 80 $kg/cm^2G$, preferably between 2 and 50 $kg/cm^2G$ in view of the polymerization activity; and the polymerization temperature may fall generally between 0 and 200° C., preferably between 30 and 100° C. The polymerization time may fall generally between 5 minutes and 20 hours or so, preferably between 10 minutes and 10 hours or so.

The molecular weight of the block copolymer to be produced could be controlled by adding a chain transfer agent, preferably hydrogen to the reaction system. If desired, an inert gas such as nitrogen or the like may be present in the reaction system.

Regarding the catalyst components for use in the invention, the component (A), the component (B) and the component (C) may be previously blended in a pre-determined ratio so that they are contacted with each other, and immediately propylene may be applied thereto to start its polymerization. Alternatively, after the catalyst components have been contacted with each other, the resulting catalyst may be ripened for 0.2 to 3 hours or so, and thereafter propylene and ethylene may be applied thereto and polymerized in the presence of the thus-ripened catalyst. If desired, the catalyst components may be previously suspended in and diluted with an inert solvent or propylene, and then fed into the polymerization system.

In the invention, the post-treatment after polymerization may be effected in any ordinary manner. For example, in gas-phase polymerization, the powdery polymer produced is taken out of the polymerization reactor, and then passed through a nitrogen stream atmosphere so as to remove the non-reacted propylene and ethylene from it. If desired, the polymer may be pelletized through an extruder. In this step, a small amount of water, an alcohol or the like may be added to the polymer so as to completely inactivate the catalyst. In bulk polymerization, the polymer produced is taken out of the polymerization reactor, then the non-reacted monomers are completely removed from it, and thereafter the polymer may be pelletized.

The invention is described in more detail with reference to the following Examples, which, however, are not intended to restrict the scope of the invention.

The test methods referred to hereinabove and actually employed in the following Examples are described below.

(1) Measurement of melt flow rate (MFR):

According to JIS K7210, each sample is measured for its MFR at 230° C. and under a load of 2.16 kg.

(2) Measurement of the amount of room-temperature xylene-soluble and insoluble components:

The room-temperature (25° C.) xylene-soluble and insoluble components are extracted from each sample, according to the following process:

<1> 5±0.05 g of a sample is put into a 1000 ml egg-plant type flask, to which is added 1±0.05 g of 2,6-di-tert-butyl-p-cresol (BHT: antioxidant). Then, a rotor is inserted into the flask, to which is added 700±10 ml of paraxylene.

<2> Next, a condenser is fitted to the flask, and the flask is heated in an oil bath at 140±5° C. for 120±30 minutes with the rotor therein being moved. In the flask in that condition, the sample is dissolved in paraxylene.

<3> Next, the content of the flask is poured into a 1000 ml beaker. With stirring it with a stirrer therein, the solution in the beaker is left cooled (for 8 hours or longer) to be at room temperature (25° C.), and the precipitate formed therein is taken out through filtration through a metal gauze filter.

<4> The filtrate having passed through the metal gauze filter is further filtered through a paper filter, and the filtrate thus having passed through the paper filter is put into 2000±100 ml of methanol in a 3000 ml beaker. While being stirred with a stirrer at room temperature (25° C.), this is left as such for 2 hours or longer.

<5> Next, the precipitate formed in the beaker is taken out through filtration through a metal gauze filter, and dried in air for 5 hours or longer and then in a vacuum drier at 100±5° C. for 240 to 270 minutes. The dry solid thus collected is a room-temperature (25° C.) xylene-soluble component of the sample.

<6> On the other hand, the residue having been collected through filtration in the previous step <3> is again dissolved in paraxylene in the same manner as in the previous steps <1> and <2>. Then, the resulting solution is, while hot, immediately poured into 2000±100 ml of methanol in a 3000 ml beaker, stirred with a stirrer for 2 hours or longer, and then left at room temperature (25° C.) overnight.

<7> Next, the precipitate thus formed in the beaker is taken out through filtration through a metal gauze filter, and dried in air for 5 hours or longer and then in a vacuum drier at 100±5° C. for 240 to 270 minutes. The dry solid thus collected is a room-temperature (25° C.) xylene-insoluble component of the sample.

The room-temperature (25° C.) xylene-soluble content (w) of the sample is represented by:

$$w\ (\%\ \text{by weight}) = 100 \times C/A,$$

wherein A indicates the weight (g) of the sample, and C indicates the weight (g) of the soluble component collected in the step <5>.

The insoluble content of the sample is represented by (100−w) % by weight.

(3) Measurement of the ethylene content of the room-temperature xylene-soluble component through $^{13}$C-NMR:

$^{13}$C-NMR as referred to herein is all effected according to the method mentioned below.

220 mg of a sample is put into an NMR sample tube, to which is added 3 ml of a mixed solvent of 1,2,4-trichlorobenzene/heavy benzene (90/10, by volume). The tube is sealed with a cap, in which the sample is uniformly dissolved in the mixed solvent at 130° C. The resulting sample solution is subjected to $^{13}$C-NMR under the following conditions:

Apparatus: JEOL's JNM-EX400,
Pulse width: 9 μs (45°),
Pulse frequency: 4 seconds,
Spectrum width: 20000 Hz,
Temperature: 130° C.,
Number of integration: 1000.

The ethylene unit content of the room-temperature (25° C.) xylene-soluble component is obtained according to the following method.

A sample is subjected to $^{13}$C-NMR, and its $^{13}$C-NMR spectrum is analyzed. From the intensity of 7 peaks appearing in the region of from 21 to 35 ppm [based on the standard of tetramethylsilane (TMS) chemical shift] in the $^{13}$C-NMR spectrum of the sample, the triad chain fraction (mol%) of ethylene (E) and propylene (P) is calculated according to the following formulae:

$$f_{EPE} = [K(T\delta\delta)/T] \times 100,$$

$$f_{PPE} = [K(T\beta\delta)/T] \times 100,$$

$$f_{EEE} = [K(S\gamma\delta)/4T + K(S\delta\delta)/2T] \times 100,$$

$$f_{PPP} = [K(T\beta\beta)/T] \times 100,$$

$$f_{PEE} = [K(S\beta\delta)/T] \times 100,$$

$$f_{PEP} = [K(S\beta\beta)/T] \times 100,$$

provided that $$T = K(T\delta\delta) + K(T\beta\delta) + k(S\gamma\delta)/4 + K(S\delta\delta)/2 + K(T\beta\beta) + K(S\beta\delta) + K(S\beta\beta),$$

wherein $f_{EPE}$ indicates the EPE triad chain fraction (mol %), and K(Tδδ) indicates the integrated intensity of the peaks assigned to the Tδδ carbon.

From the triad chain fraction obtained as above, the ethylene unit content (x % by weight) of the sample is calculated according to the following formula:

Ethylene unit content (% by weight)

$$28\{3f_{EEE} + 2(f_{PEE} + f_{EPE}) + f_{PPE} + f_{PEP}\} \times 100/[28\{3f_{EEE} + 2(f_{PEE} + f_{EPE}) + f_{PPE} + f_{PEP}\} + 42\{3f_{PPP} + 2(f_{PPE} + f_{PEP}) + f_{EPE} + f_{PEE}\}].$$

(4) Measurement of the stereospecificity index of the room temperature xylene-insoluble component through $^{13}$C-NMR:

The stereospecificity index of the room temperature xylene-insoluble component is obtained according to the following method.

In the $^{13}$C-NMR spectrum of the room-temperature xylene-insoluble component, the methyl carbon signals are seen as 9 peaks for mmmm, mmmr, rmmr, mmrr, mmrm+rrmr, rmrm, rrrr, mrrr and mrrm that appear from the low magnetic field to the high magnetic field, owing to the influence of the stereospecificity of the component on them. From those 9 peaks, 6 peaks with high intensity of mmmm, mmmr, mmrr, mmrm+rrmr, rrrr and mrrm are extracted, and the stereospecificity index of the insoluble component is calculated according to the following formula:

Stereospecificity Index (%)
=Lmmmm x 100/ (Lmmmm +Lmmmr +Lmmrr +L(mmmrm+rrmr) +Lrrrr +Lmrrm), wherein Lmmmm, Lmmmr, Lmmrr, L(mmrm+rrmr), Lrrrr and Lmrrm indicate the height from the base line of the peaks for mmmm, mmmr, mmrr, (mmrm +rrmr), rrrr and mrrm, respectively, in the $^{13}$C-NMR spectrum; and the height from the base line of the peaks for mmmm and mmmr is corrected in an ordinary manner, since the peak for mmmm is composed of a plurality of scattering points each having a different chemical shift and a different peak height and since the peak for mmmr is on the tail of the main peak for mmmm.

(5) Measurement of T1 relaxation time for the room-temperature xylene-soluble component through pulse NMR:

T1 is a time constant for magnetization restoration in the longitudinal direction. A contrarotation restoration method (180°-t-90° pulse method) is the most popular for determining T1. With a pulse at θ=180° at t=0, a sample is first magnetized in the —z' direction, and then this is restored to the thermal equilibrium value $M_0$. After a period of time τ, the sample is made to receive a pulse at 90°, and its magnetization is rotated in the y' direction, whereupon an FID signal that is proportional to the degree of the magnetization is observed. With the time τ varying continuously, a restoration curve for the signal intensity M (τ) is obtained. Based on the Bloch's equation under the initiation condition of M(O)=—$M_0$, the magnetization restoration in the longitudinal direction is represented by:

$$M=M_0\{1-2\exp(-\tau/T1)\}.$$

In practice, $\ln\{M(\infty)-M(\tau)\}=\ln\{2M(\infty)\}-/T1$. Therefore, based on the degree of inclination of the line as produced by plotting the data of $\ln\{M(\infty)-M(\tau)\}\sim\tau$, T1 can be determined.

In a series of measurement operations including repeated experiments for integration, time must be taken before the magnetization is restored to the thermal equilibrium state, and a stand-by time of at least 5T1 or longer will be needed. 99.3% of the magnetization could be restored within a period of 5T1. Therefore, for M(∞), employed is the value of M(τ) with τ>5T1.

The measurement is effected under the following conditions, for which is used a pulse NMR device from Bulcur, CXP-90.

Nuclei targeted for measurement: hydrogen atom nuclei,
Frequency: 90 MHz,
Temperature: 30° C.,
Method: contrarotation restoration method (180°-τ-90° pulse method),
180°; 180° pulse,
90°: 90° pulse,
τ: variable time,
90° pulse width: 2.3 to 2.4 μseconds.

(6) Determination of the ratio by weight, z (%), of the amount of crystalline polyethylene to the total of the amount of ethylene-propylene copolymer and the amount of crystalline polyethylene, from the TEM (transmission electronic microscope) image of propylene-ethylene block copolymer:

<1> Pellets of a sample are melted and press-molded, and the resulting moldings are chamfered with a microtome, and then stained with ruthenium.

<2> The stained moldings are sliced with a microtome into ultra-thin slices. Each slice is observed with a transmission electronic microscope.

<3> TEM images (x25,000) are taken in different visual fields, totaling 30 pictures.

<4> Each picture is enlarged 100,000 times to give an enlarged image of 326 mm×232 mm in size.

<5> In each enlarged image, the continuous phase of propylene homopolymer segments is seen white, and the dispersed phase of ethylene-propylene copolymer segments are seen dark. In the dispersed phase, whitish "crystalline polyethylene segments" of snake-like polyethylene crystal lamellas are doughnut-wise enclosed with "ethylene-propylene copolymer segments" which are relatively dark and of which the inner structure could not be observed.

<6> All dispersed phases having a major diameter of not smaller than 1 cm (that is, not smaller than 100 nm in actual size) are cut out from all 30 images, using scissors, and their total weight is measured in a precision balance. This is the "total weight (g) of the ethylene-propylene copolymer segments and the crystalline polyethylene segments" in the sample.

<7> From all dispersed phase having a major diameter of not smaller than 1 cm and having been cut out previously, the crystalline polyethylene segments of snake-like polyethylene crystal lamellas are cut out, and their total weight is measured in a precision balance. This is the "weight (g) of the crystalline polyethylene segments" in the sample.

<8> The ratio, z (%), to be obtained is represented as follows:

z (%)=[weight of crystalline polyethylene segments (g)]/ [total weight of ethylene-propylene copolymer segments and crystalline polyethylene segments (g)]×100.

Typical pictures of TEM images are in FIG. 3 to FIG. 6.

(7) Measurement of impact resistance:

According to JIS K7110, injection moldings are measured for their Izod impact strength (with notch) at 23° C. and at −30° C.

(8) Measurement of flexural modulus:

According to JIS K7203, injection moldings are measured for their flexural modulus.

(9) Measurement of surface hardness:

According to JIS K7202, injection moldings are measured for their Rockwell hardness (R scale).

(10) Measurement of heat distortion temperature:

According to JIS K7207, injection moldings are measured for their distortion temperature under high load.

Preparation of Polymerization Catalysts:

(1) Preparation of Catalyst A:

Preparation of solid catalyst component:

A three-neck flask having a capacity of 5 liters and equipped with a stirrer was purged with nitrogen, and 160 g of diethoxymagnesium was put thereinto, to which was added 600 ml of dewatered octane. This was heated at 40° C., and 24 ml of silicon tetrachloride was added thereto and stirred for 20 minutes, to which was added 16 ml of dibutyl phthalate. This was further heated to have an inner temperature of 80° C., and 770 ml of titanium tetrachloride was dropwise added thereto through a dropping funnel. Next, this was still further heated to have an inner temperature of 125° C., at which the compounds were contacted with each other for 2 hours. After this, stirring the mixture in the flask was stopped, and the mixture precipitated to give a solid therein. The supernatant was removed. Then, 1000 ml of dewatered octane was added to this, and heated up to 125° C. with stirring. This was kept at the elevated temperature for 1 minute, and then stirring it was stopped, whereby this precipitated to give a solid. The supernatant was removed. The washing operation was repeated 7 times. Next, 1220 ml of titanium tetrachloride was added to this, which was again heated to have an inner temperature of 125° C., at which the compounds were contacted with each other for 2 hours. Next, this was washed with dewatered octane at 125° C. in the same manner as previously, and the washing operation was repeated 6 times. Thus was obtained a solid catalyst component.

Pre-polymerization:

A three-neck flask having a capacity of 1 liter and equipped with a stirrer was purged with nitrogen, and 48 g of the solid catalyst component was put thereinto. 400 ml of dewatered heptane was added to this, and heated at 40° C. With stirring it, 2.0 ml of triethylaluminium and 6.3 ml of dicyclopentyldimethoxysilane were added thereto. Propylene gas was introduced into this under normal pressure, and reacted for 2 hours. Next, the solid component was fully washed with dewatered heptane to obtain a catalyst A.

(2) Preparation of Catalyst A':

Preparation of solid catalyst component:

A three-neck flask having a capacity of 5 liters and equipped with a stirrer was purged with nitrogen, and 160 g of diethoxymagnesium was put thereinto, to which was added 600 ml of dewatered decane. This was heated at 40° C., and 24 ml of silicon tetrachloride was added thereto and stirred for 20 minutes, to which was added 16 ml of dibutyl phthalate. This was further heated to have an inner temperature of 80° C., and 770 ml of titanium tetrachloride was dropwise added thereto through a dropping funnel. Next, this was still further heated to have an inner temperature of 125° C., at which the compounds were contacted with each other for 2 hours. After this, stirring the mixture in the flask was stopped, and the mixture precipitated to give a solid therein. The supernatant was removed. Then, 1000 ml of dewatered decane was added to this, and heated up to 135° C. with stirring. This was kept at the elevated temperature for 1 minute, and then stirring it was stopped, whereby this precipitated to give a solid. The supernatant was removed. The washing operation was repeated 7 times. Next, 1220 ml of titanium tetrachloride was added to this, which was again heated to have an inner temperature of 135° C., at which the compounds were contacted with each other for 2 hours. Next, this was washed with dewatered decane at 135° C. in the same manner as previously, and the washing operation was repeated 6 times. Thus was obtained a solid catalyst component.

Pre-polymerization:

A three-neck flask having a capacity of 1 liter and equipped with a stirrer was purged with nitrogen, and 48 g of the solid catalyst component was put thereinto. 400 ml of dewatered heptane was added to this, and heated at 40° C. With stirring it, 2.0 ml of triethylaluminium and 2.8 ml of 1,1-dimethoxy-2,6-dimethyl-1-silacyclohexane were added thereto. Propylene gas was introduced into this under normal pressure, and reacted for 2 hours. Next, the solid component was fully washed with dewatered heptane to obtain a catalyst A'.

(3) Preparation of Catalyst B:

Preparation of solid catalyst component:

A three-neck flask having a capacity of 5 liters and equipped with a stirrer was purged with nitrogen, and 160 g of diethoxymagnesium was put thereinto, to which was added 600 ml of dewatered heptane. This was heated at 40° C., and 24 ml of silicon tetrachloride was added thereto and stirred for 20 minutes, to which was added 25 ml of dibutyl phthalate. This was further heated to have an inner temperature of 80° C., and 770 ml of titanium tetrachloride was dropwise added thereto through a dropping funnel. Next, this was still further heated to have an inner temperature of 110° C., at which the compounds were contacted with each other for 2 hours. Next, this was washed 7 times with dewatered heptane at 90° C. 1220 ml of titanium tetrachloride was again added to this, and heated to have an inner temperature of 110° C., at which the compounds were contacted with each other for 2 hours. Next, this was washed 6 times with dewatered heptane at 60° C. to obtain a solid catalyst component.

Pre-polymerization:

A three-neck flask having a capacity of 1 liter and equipped with a stirrer was purged with nitrogen, and 48 g of the solid catalyst component was put thereinto. 400 ml of dewatered heptane was added to this, and heated at 40° C. With stirring it, 2.0 ml of triethylaluminium and 6.3 ml of dicyclopentyldimethoxysilane were added thereto. Propylene gas was introduced into this under normal pressure, and reacted for 2 hours. Next, the solid component was fully washed with dewatered heptane to obtain a catalyst B.

(4) Preparation of Catalyst C:

Preparation of solid catalyst component:

A three-neck flask having a capacity of 5 liters and equipped with a stirrer was purged with nitrogen, and 160 g of diethoxymagnesium was put thereinto, to which was added 600 ml of dewatered heptane. This was heated at 40° C., and 24 ml of silicon tetrachloride was added thereto and stirred for 20 minutes, to which was added 23 ml of dibutyl phthalate. This was further heated to have an inner temperature of 80° C., and 770 ml of titanium tetrachloride was dropwise added thereto through a dropping funnel. This was still further heated to have an inner temperature of 110° C., at which the compounds were contacted with each other for 2 hours. Next, this was washed 7 times with dewatered heptane at 90° C. 1220 ml of titanium tetrachloride was again added to this, and heated to have an inner temperature of 110° C., at which the compounds were contacted with each other for 2 hours. Next, this was washed 6 times with dewatered heptane at 60° C. to obtain a solid catalyst component.

Pre-polymerization:

A three-neck flask having a capacity of 1 liter and equipped with a stirrer was purged with nitrogen, and 48 g of the solid catalyst component was put thereinto. 400 ml of dewatered heptane was added to this. With stirring it at 10° C., 2.7 ml of triethylaluminium and 2 ml of cyclohexylmethyldimethoxysilane were added thereto. Propylene gas was introduced into this under normal pressure, and reacted for 2 hours. Next, the solid component was fully washed with dewatered heptane to obtain a catalyst C.

EXAMPLE 1

A stainless steel autoclave having a capacity of 5 liters and equipped with a stirrer was fully dried with nitrogen gas and then purged with propylene gas. This was kept heated at 70° C., and propylene gas was introduced thereinto to have an increased pressure of 0.5 kg/cm$^2$G. In that condition, hydrogen gas was introduced thereinto to have an increased pressure of 5.5 kg/cm$^2$G, and propylene gas was further introduced thereinto so that its pressure could increase gradually up to 28 kg/cm$^2$G. On the other hand, 20 ml of heptane, 4 mmols of triethylaluminium, 1 mmol of dicyclopentyldimethoxysilane and 0.02 mmols of the catalyst A were metered in a 60 ml catalyst supply tube having been purged with nitrogen gas, and these were all put into the autoclave, in which propylene was polymerized for 60 minutes in the presence of these. Next, the autoclave was degassed to have an atmospheric pressure, then purged with nitrogen, and again degassed in vacuum. Next, ethylene gas/propylene gas in a ratio of ½ by mol was introduced into the autoclave to have an increased pressure of 10 kg/cm$^2$G, and kept under the increased pressure of 10 kg/cm$^2$G at 70° C. for 40 minutes to attain propylene-ethylene copolymerization. After this, the autoclave was degassed to have an atmospheric pressure and cooled to room temperature. In that condition, the autoclave was opened, and the polymer powder formed was taken out of it.

To the thus-obtained block polypropylene powder, added were 1000 ppm of calcium stearate and 500 ppm of DHT-4A (magnesium aluminium hydroxide carbonate hydrate, from Kyowa Chemical Industry) both serving as a neutralizing agent, and 750 ppm of P-EPQ (tetrakis(2,4-di-t-butylphenyl 4,4-bisphenylenediphosphonite, from Asahi Denka Industry) and 1500 ppm of Irganox 1010 (phenolic antioxidant from Ciba Speciality Chemicals) both serving as an antioxidant, and well blended. The resulting mixture was kneaded in melt and pelletized through a 20 mmφ single-screw melt extruder into pellets. A part of the pellets were subjected to the predetermined structural analysis tests. The remaining pellets were molded through injection into test pieces, which were tested for their physical properties. The data of the structural analyses and the data of the physical properties are shown in Table 1.

EXAMPLE 2

The same process as in Example 1 was repeated, except that the ratio of ethylene/propylene gas introduced into the autoclave for copolymerization was 1/1 by mol herein. The data obtained are in Table 1.

EXAMPLE 3

The same process as in Example 1 was repeated, except that the polymerization time for the homopolymer segments was 30 minutes herein. The data obtained are in Table 1.

EXAMPLE 4

The same process as in Example 1 was repeated, except that 0.5 kg/cm$^2$G of hydrogen gas was introduced into the autoclave for the copolymer segments herein. The data obtained are in Table 1.

EXAMPLE 5

The same process as in Example 1 was repeated, except that the polymerization time for the copolymer segments was 20 minutes herein. The data obtained are in Table 1.

EXAMPLE 6

The same process as in Example 1 was repeated, except that the polymerization time for the copolymer segments was 90 minutes herein. The data obtained are in Table 1.

COMPARATIVE EXAMPLE 1

The same process as in Example 1 was repeated, except that the catalyst B was used herein in place of the catalyst A used in Example 1. The data obtained are in Table 1.

The low-temperature Izod impact strength of the samples produced in Comparative Example 1 was nearly comparable to that of the samples produced in Examples 1 and 2, but the flexural modulus of the former was lower than that of the latter. This means that the balance of the rigidity and the impact resistance of the samples produced in Comparative Example 1 is not good, as compared with that of the samples produced in Examples 1 and 2.

COMPARATIVE EXAMPLE 2

The same process as in Example 1 was repeated, except that the catalyst B was used herein in place of the catalyst A used in Example 1 and that the molar ratio of ethylene/propylene gas introduced into the autoclave for copolymerization was 1/1 herein. The data obtained are in Table 1.

In FIG. 1, the data of the flexural modulus and the low-temperature Izod impact strength of the samples shown in Table 1 are plotted. As in FIG. 1, it is seen that the balance of the rigidity and the impact resistance of the samples produced in Comparative Example 2 is inferior to that of the samples produced in Examples.

COMPARATIVE EXAMPLE 3

The same process as in Example 1 was repeated, except that the catalyst B was used herein in place of the catalyst A used in Example 1 and that the polymerization time for the homopolymer segments was 30 minutes herein. The data obtained are in Table 1.

The samples produced in Comparative Example 3 are nearly equivalent to those in Example 6 in the rigidity and the low-temperature impact resistance, but the former are inferior to the latter in the heat resistance.

COMPARATIVE EXAMPLE 4

The same process as in Example 1 was repeated, except that the catalyst B was used herein in place of the catalyst A used in Example 1 and that the polymerization time for the copolymer segments was 90 minutes herein. The data obtained are in Table 2.

The samples produced in Comparative Example 4 are nearly similar to but inferior in some degree to those in Example 6 in the mechanical strength, the surface hardness and the heat resistance.

COMPARATIVE EXAMPLE 5

The same process as in Example 1 was repeated, except that the catalyst B was used herein in place of the catalyst A used in Example 1 and that the polymerization time for the copolymer segments was 20 minutes herein. The data obtained are in Table 2.

As in FIG. 1, it is seen that the samples produced in Comparative Example 5 are equivalent to those in Examples in the balance of the rigidity and the low-temperature impact resistance (at −30° C.). However, as in Tables 1 and 2, the former are inferior to the latter in the balance of the rigidity and the impact resistance at 23° C.

COMPARATIVE EXAMPLE 6

The same process as in Example 1 was repeated, except that the catalyst C was used herein in place of the catalyst A used in Example 1 and that cyclohexylmethyldimethoxysilane was used in place of dicyclopentyldimethoxysilane. The data obtained are in Table 2.

COMPARATIVE EXAMPLE 7

The same process as in Example 1 was repeated, except that the catalyst C was used herein in place of the catalyst A used in Example 1, that cyclohexylmethyldimethoxysilane was used in place of dicyclopentyldimethoxysilane, that 0.5 kg/cm$^2$G of hydrogen gas was introduced into the autoclave for the copolymer segments, and that the molar ratio of ethylene gas/propylene gas introduced into the autoclave for copolymerization was ¼. The data obtained are in Table 2.

COMPARATIVE EXAMPLE 8:

The same process as in Example 1 was repeated, except that the catalyst C was used herein in place of the catalyst A used in Example 1, that cyclohexylmethyldimethoxysilane was used in place of dicyclopentyldimethoxysilane, and that the molar ratio of ethylene gas/propylene gas introduced into the autoclave for copolymerization was ⅕. The data obtained are in Table 2.

COMPARATIVE EXAMPLE 9

The same process as in Example 1 was repeated, except that the catalyst C was used herein in place of the catalyst A used in Example 1, that cyclohexylmethyldimethoxysilane was used in place of dicyclopentyldimethoxysilane, that 0.1 kg/cm$^2$G of hydrogen gas was introduced into the autoclave for the copolymer segments, and that the molar ratio of ethylene gas/propylene gas introduced into the autoclave for copolymerization was ¼. The data obtained are in Table 2.

COMPARATIVE EXAMPLE 10

The same process as in Example 1 was repeated, except that the catalyst C was used herein in place of the catalyst A used in Example 1, that cyclohexylmethyldimethoxysilane was used in place of dicyclopentyldimethoxysilane, and that the molar ratio of ethylene gas/propylene gas introduced into the autoclave for copolymerization was ¼. The data obtained are in Table 2.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| MFR (g/10 min) | 3.5 | 2.2 | 1.3 | 6.5 | 5.8 | 0.8 | 4.2 | 2.2 | 1.2 |
| Room-temperature Xylene-soluble Component (wt. %) | 19.7 | 19.6 | 30.8 | 18.3 | 12.9 | 36.5 | 23.8 | 26.6 | 34.2 |
| Stereospecificity of Room-temperature Xylene-insoluble Component (%) | 99.3 | 99.4 | 99.0 | 99.1 | 99.3 | 98.9 | 99.1 | 99.0 | 99.0 |
| Ethylene Content of Room-temperature Xylene-soluble Component (x) (%) | 39.9 | 52.6 | 38.2 | 40.6 | 42.1 | 32.5 | 35.0 | 47.8 | 36.4 |
| Value of the Right Side in Formula (I) | 133.1 | 126.1 | 136.2 | 132.0 | 129.7 | 149.2 | 143.1 | 124.9 | 139.9 |
| T1* in Pulse NMR of Room-temperature Xylene-soluble Component (y) (msec) | 132 | 123 | 134 | 128 | 129 | 146 | 151 | 128 | 143 |
| Flexural Modulus (MPa) | 1002 | 990 | 719 | 1077 | 1264 | 568 | 914 | 822 | 603 |
| Rockwell Hardness (R scale) | 81 | 77 | 54 | 85 | 94 | 38 | 75 | 64 | 40 |
| Heat Distortion Temperature (under high load) (° C.) | 50 | 50.4 | 46.5 | 53.8 | 55.4 | 45.3 | 48.7 | 48.4 | 44.8 |
| Izod Impact Strength |  |  |  |  |  |  |  |  |  |
| (at −30° C.) (kJ/m$^2$) | 9.1 | 9.7 | 74 | 7.9 | 5.9 | 97 | 8.6 | 14.5 | 91 |
| (at 23° C.) (kJ/m$^2$) | 72 | 76 | 81 | 51 | 14.4 | 74 | 74 | 75 | 76 |

*The T1 relaxation time component found in Examples and Comparative Examples was only the component shown in the Table.

TABLE 2

|  | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|
| MFR (g/10 min) | 0.8 | 8.1 | 6.8 | 12.2 | 8.6 | 6.7 | 5.3 |
| Room-temperature Xylene-soluble Component (wt. %) | 36 | 15.4 | 20.7 | 25.1 | 15.4 | 22.9 | 26.0 |
| Stereospecificity of Room-temperature Xylene-insoluble Component (%) | 98.7 | 99.1 | 96.8 | 96.3 | 95.6 | 96.4 | 96.5 |
| Ethylene Content of Room-temperature Xylene-soluble Component (x) (%) | 32.4 | 40.4 | 39.7 | 23.4 | 20.1 | 25 | 25.8 |
| Value of the Right Side in Formula (I) | 149.5 | 132.3 | 133.5 | 175.2 | 185.1 | 170.4 | 168.0 |
| T1* in Pulse NMR of Room-temperature Xylene-soluble Component (y) (msec) | 147 | 133 | 141 | 193 | 225 | 184 | 184 |
| Flexural Modulus (MPa) | 548 | 1149 | 843 | 758 | 842 | 720 | 790 |
| Rockwell Hardness (R scale) | 37 | 90 | 69 | 65 | 77 | 59 | 67 |
| Heat Distortion Temperature (under high load) (° C.) | 44.4 | 53.4 | 49.2 | 50.3 | 49.2 | 48.0 | 48.6 |
| Izod Impact Strength |  |  |  |  |  |  |  |
| (at −30° C.) (kJ/m$^2$) | 94 | 5.9 | 8.6 | 3.3 | 1.9 | 6 | 7 |
| (at 23° C.) (kJ/m$^2$) | 70 | 14.1 | 71 | 18.3 | 10.7 | 70 | 72 |

*The T1 relaxation time component found in Examples and Comparative Examples was only the component shown in the Table.

EXAMPLE 7

A stainless steel autoclave having a capacity of 5 liters and equipped with a stirrer was fully dried with nitrogen gas and then purged with propylene gas. This was kept heated at 70° C., and propylene gas was introduced thereinto to have an increased pressure of 0.5 kg/cm$^2$G. In that condition, hydrogen gas was introduced thereinto to have an increased pressure of 5.5 kg/cm$^2$G, and propylene gas was further introduced thereinto so that its pressure could increase gradually up to 28 kg/cm$^2$G. On the other hand, 20 ml of heptane, 4 mmols of triethylaluminium, 1 mmol of dicyclopentyldimethoxysilane and 0.02 mmols of the catalyst A' were metered in a 60 ml catalyst supply tube having been purged with nitrogen gas, and these were all put into the autoclave, in which propylene was polymerized for 60 minutes in the presence of these. Next, the autoclave was degassed to have an atmospheric pressure, then purged with nitrogen, and again degassed in vacuum. Next, ethylene gas/propylene gas in a ratio of ½ by mol was introduced into the autoclave to have an increased pressure of 10 kg/cm$^2$G, and kept under the increased pressure of 10 kg/cm$^2$G at 70° C. for 40 minutes to attain propylene-ethylene copolymerization. After this, the autoclave was degassed to have an atmospheric pressure and cooled to room temperature. In that condition, the autoclave was opened, and the polymer powder formed was taken out of it.

To the thus-obtained block polypropylene powder, added were 1000 ppm of calcium stearate and 500 ppm of DHT-4A (magnesium aluminium hydroxide carbonate hydrate, from Kyowa Chemical Industry) both serving as a neutralizing agent, and 750 ppm of P-EPQ (tetrakis(2,4-di-t-butylphenyl 4,4-bisphenylenediphosphonite, from Asahi Denka Industry) and 1500 ppm of Irganox 1010 (phenolic antioxidant from Ciba Speciality Chemicals) both serving as an antioxidant, and well blended. The resulting mixture was kneaded in melt and pelletized through a 20 mmφ single-screw melt extruder into pellets. A part of the pellets were subjected to the predetermined structural analysis tests. The remaining pellets were molded through injection into test pieces, which were tested for their physical properties. The data of the structural analyses and the data of the physical properties are shown in Table 3.

EXAMPLE 8

The same process as in Example 7 was repeated, except that the ratio of ethylene/propylene gas introduced into the autoclave for copolymerization was 1/1 by mol herein. The data obtained are in Table 3.

EXAMPLE 9

The same process as in Example 1 was repeated, except that the polymerization time for the homopolymer segments was 30 minutes herein. The data obtained are in Table 3.

EXAMPLE 10

The same process as in Example 7 was repeated, except that 0.5 kg/cm$^2$G of hydrogen gas was introduced into the autoclave for the copolymer segments herein. The data obtained are in Table 3.

EXAMPLE 11

The same process as in Example 7 was repeated, except that the polymerization time for the copolymer segments was 20 minutes herein. The data obtained are in Table 3.

EXAMPLE 12

The same process as in Example 7 was repeated, except that the polymerization time for the copolymer segments was 90 minutes herein. The data obtained are in Table 3.

COMPARATIVE EXAMPLE 11

The same process as in Example 7 was repeated, except that the catalyst B was used herein in place of the catalyst A' used in Example 7. The data obtained are in Table 3.

The low-temperature Izod impact strength of the samples produced in Comparative Example 11 was nearly comparable to that of the samples produced in Example 7, but the flexural modulus of the former was lower than that of the latter. This means that the balance of the rigidity and the impact resistance of the samples produced in Comparative Example 11 is not good, as compared with that of the samples produced in Example 7.

COMPARATIVE EXAMPLE 12

The same process as in Example 7 was repeated, except that the catalyst B was used herein in place of the catalyst A' used in Example 7 and that the molar ratio of ethylene/propylene gas introduced into the autoclave for copolymerization was 1/1 herein. The data obtained are in Table 3.

Figure 2:
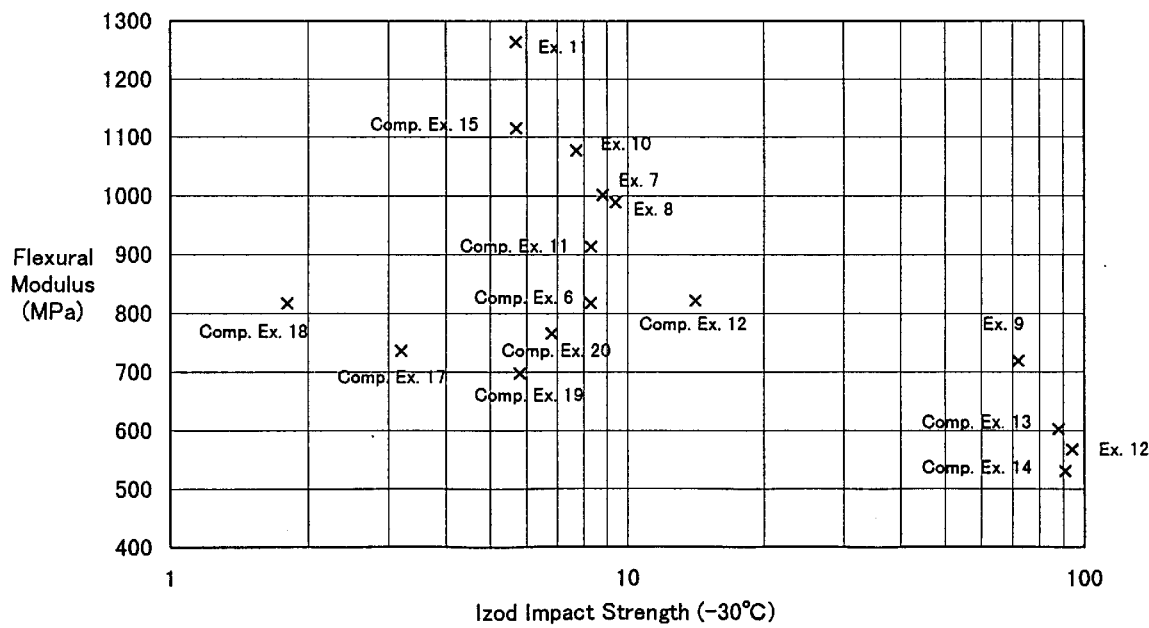
FIG. 2 shows the flexural modulus versus the Izod impact strength (at -30° C.) of the samples in Examples 7 to 12 and Comparative Examples 11 to 20.
Figure 3:
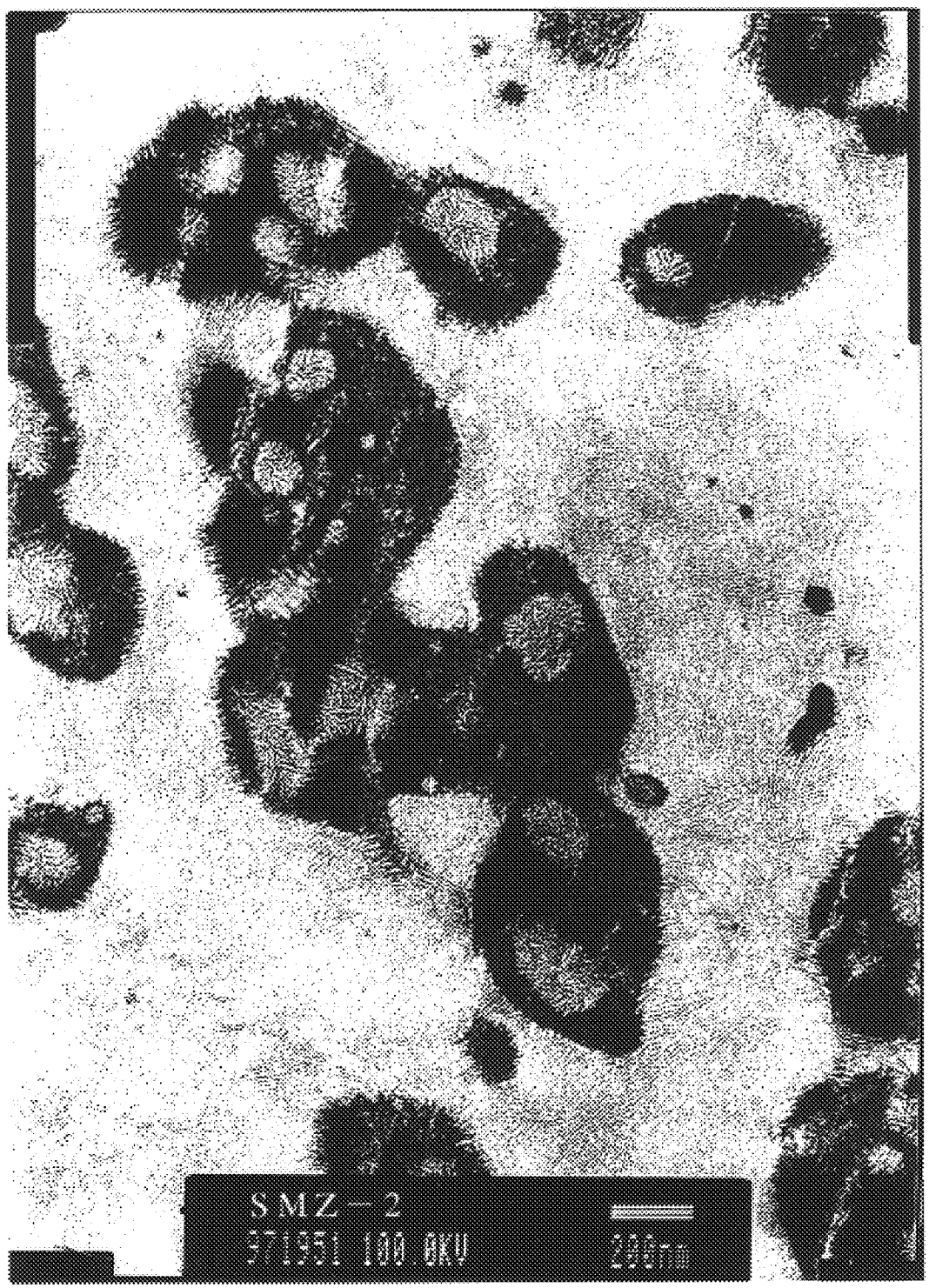
FIG. 3 is a TEM image of one example of the polymers of the invention.
Figure 4:
FIG. 4 is a TEN image of a part of the polymer of FIG. 3.
Figure 5:
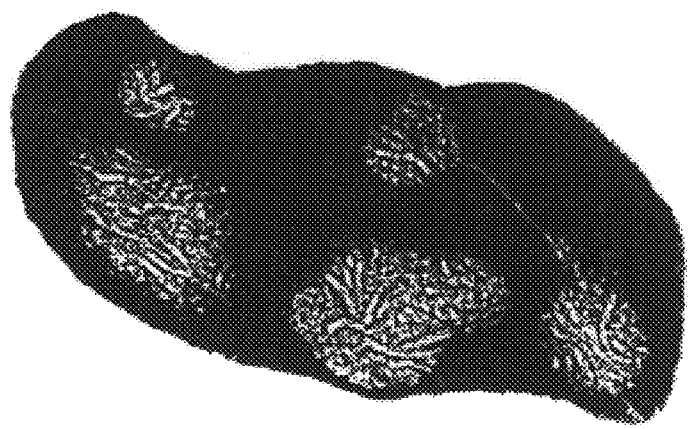
FIG. 5 is the part of "ethylene-propylene copolymer and crystalline polyethylene" as extracted from FIG. 4.
Figure 6:
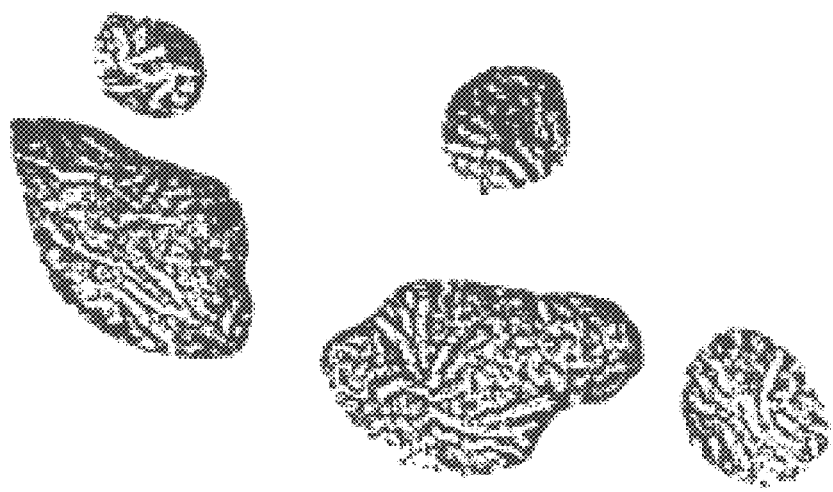
FIG. 6 is the part of "crystalline polyethylene" as extracted from FIG. 5.

In FIG. 2, the data of the flexural modulus and the low-temperature Izod impact strength of the samples shown in Table 3 are plotted. As in FIG. 2, it is seen that the balance of the rigidity and the impact resistance of the samples produced in Comparative Example 12 is inferior to that of the samples produced in Examples.

COMPARATIVE EXAMPLE 13

The same process as in Example 7 was repeated, except that the catalyst B was used herein in place of the catalyst A' used in Example 7 and that the polymerization time for the homopolymer segments was 30 minutes herein. The data obtained are in Table 3.

The samples produced in Comparative Example 13 are nearly equivalent to those in Example 12 in the rigidity and the low-temperature impact resistance, but the former are inferior to the latter in the heat resistance.

COMPARATIVE EXAMPLE 14

The same process as in Example 7 was repeated, except that the catalyst B was used herein in place of the catalyst A' used in Example 7 and that the polymerization time for the copolymer segments was 90 minutes herein. The data obtained are in Table 4.

The samples produced in Comparative Example 14 are nearly similar to but inferior in some degree to those in Example 12 in the mechanical strength, the surface hardness and the heat resistance.

COMPARATIVE EXAMPLE 15

The same process as in Example 7 was repeated, except that the catalyst B was used herein in place of the catalyst A' used in Example 7 and that the polymerization time for the copolymer segments was 20 minutes herein. The data obtained are in Table 4.

As in FIG. 2, it is seen that the samples produced in Comparative Example 15 are equivalent to those in Examples in the balance of the rigidity and the low-temperature impact resistance (at −30° C.). However, as in Tables 3 and 4, the former are inferior to the latter in the balance of the rigidity and the impact resistance at 23° C.

COMPARATIVE EXAMPLE 16

The same process as in Example 7 was repeated, except that the catalyst C was used herein in place of the catalyst A' used in Example 7 and that cyclohexylmethyldimethoxysilane was used in place of dicyclopentyldimethoxysilane. The data obtained are in Table 4.

COMPARATIVE EXAMPLE 17

The same process as in Example 7 was repeated, except that the catalyst C was used herein in place of the catalyst A' used in Example 7, that cyclohexylmethyldimethoxysilane was used in place of dicyclopentyldimethoxysilane, that 0.5 kg/cm$^2$G of hydrogen gas was introduced into the autoclave for the copolymer segments, and that the molar ratio of ethylene gas/propylene gas introduced into the autoclave for copolymerization was ¼. The data obtained are in Table 4.

COMPARATIVE EXAMPLE 18

The same process as in Example 7 was repeated, except that the catalyst C was used herein in place of the catalyst A' used in Example 7, that cyclohexylmethyldimethoxysilane was used in place of dicyclopentyldimethoxysilane, and that the molar ratio of ethylene gas/propylene gas introduced into the autoclave for copolymerization was ⅕. The data obtained are in Table 4.

COMPARATIVE EXAMPLE 19

The same process as in Example 7 was repeated, except that the catalyst C was used herein in place of the catalyst A' used in Example 7, that cyclohexylmethyldimethoxysilane was used in place of dicyclopentyldimethoxysilane, that 0.1 kg/cm$^2$G of hydrogen gas was introduced into the autoclave for the copolymer segments, and that the molar ratio of ethylene gas/propylene gas introduced into the autoclave for copolymerization was ¼. The data obtained are in Table 4.

COMPARATIVE EXAMPLE 20

The same process as in Example 7 was repeated, except that the catalyst C was used herein in place of the catalyst A' used in Example 7, that cyclohexylmethyldimethoxysilane was used in place of dicyclopentyldimethoxysilane, and that the molar ratio of ethylene gas/propylene gas introduced into the autoclave for copolymerization was ¼. The data obtained are in Table 4.

TABLE 3

|  | Ex. 7 | Ex. 8 | Ex. 9 | Ex. 10 | Ex. 11 | Ex. 12 | Comp. Ex. 11 | Comp. Ex. 12 | Comp. Ex. 13 |
|---|---|---|---|---|---|---|---|---|---|
| MFR (g/10 min) | 3.4 | 2.1 | 1.3 | 6.3 | 5.6 | 0.8 | 4.0 | 2.1 | 1.1 |
| Room-temperature Xylene-soluble Component (wt. %) | 19.1 | 19.0 | 30.0 | 17.8 | 12.5 | 35.4 | 23.1 | 25.8 | 33.2 |
| Stereospecificity of Room-temperature Xylene-insoluble Component (%) | 99.2 | 99.3 | 99.1 | 99.2 | 99.4 | 98.9 | 99.2 | 99.0 | 99.1 |
| Ethylene Content of Room-temperature Xylene-soluble Component (x) (wt. %) | 38.7 | 51.0 | 37.1 | 39.4 | 40.8 | 31.5 | 34.0 | 46.4 | 35.3 |
| Proportion of Crystalline Polyethylene Segments (z) (%) | 18.2 | 36.4 | 16.3 | 19.0 | 20.9 | 10.6 | 18.1 | 34.0 | 19.6 |
| Value of the Right Side of Formula (II) | 21 | 39 | 19 | 22 | 24 | 14 | 16 | 32 | 17 |
| Flexural Modulus (MPa) | 1002 | 990 | 719 | 1077 | 1264 | 568 | 914 | 822 | 603 |
| Rockwell Hardness (R scale) | 79 | 75 | 52 | 82 | 91 | 37 | 73 | 62 | 39 |
| Heat Distortion Temperature (under high load) (° C.) | 49 | 48.9 | 45.1 | 52.2 | 53.7 | 43.9 | 47.2 | 46.9 | 43.5 |
| Izod Impact Strength |  |  |  |  |  |  |  |  |  |
| (at −30° C.) (kJ/m$^2$) | 8.8 | 9.4 | 72 | 7.7 | 5.7 | 94.1 | 8.3 | 14.1 | 88 |
| (at 23° C.) (kJ/m$^2$) | 70 | 74 | 79 | 49 | 13.9 | 72 | 72 | 72.8 | 74 |

TABLE 4

|  | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|
| MFR (g/10 min) | 0.8 | 7.9 | 6.6 | 11.8 | 8.3 | 6.5 | 5.1 |
| Room-temperature Xylene-soluble Component (wt. %) | 35 | 14.9 | 20.0 | 24.3 | 14.9 | 22.2 | 25.2 |
| Stereospecificity of Room-temperature Xylene-insoluble Component (%) | 98.6 | 99.0 | 96.8 | 96.2 | 95.8 | 96.2 | 96.6 |
| Ethylene Content of Room-temperature Xylene-soluble Component (x) (wt. %) | 31.4 | 39.2 | 38.5 | 22.7 | 19.5 | 24.3 | 25.0 |
| Proportion of Crystalline Polyethylene Segments (z) (%) | 15.5 | 24.2 | 36.9 | 20.9 | 22.3 | 22.3 | 16.9 |
| Value of the Right Side of Formula (II) | 14 | 21 | 21 | 6 | 4 | 7 | 8 |
| Flexural Modulus (MPa) | 531 | 1115 | 818 | 736 | 817 | 698 | 766 |
| Rockwell Hardness (R scale) | 36 | 87 | 67 | 63 | 75 | 57 | 65 |
| Heat Distortion Temperature (under high load) (° C.) | 43 | 52 | 47.7 | 48.8 | 47.7 | 46.6 | 47 |
| Izod Impact Strength |  |  |  |  |  |  |  |
| (at −30° C.) (kJ/m$^2$) | 91 | 5.7 | 8.3 | 3.2 | 1.8 | 5.8 | 6.8 |
| (at 23° C.) (kJ/m$^2$) | 68 | 13.7 | 68.9 | 17.8 | 10.3 | 68 | 70 |

The propylene-ethylene block copolymers of the invention all have the advantage of good balance between their flexural modulus and Izod impact strength (at −30° C. and at 23° C.), between their Rockwell hardness and Izod impact strength (at −30° C. and at 23° C.), and their heat distortion temperature (under high load) and Izod impact strength (at −30° C. and at 23° C.).

Therefore, the block copolymers have many applications in various fields. For example, they are favorable to washtubs, housings and other parts for electric appliances for household use; car parts such as trims, instrument panels, bumpers, etc; containers such as bags, retort containers, etc; films such as those to be produced through orientation, tubular process, etc; sheets such as those to be formed through extrusion, etc; and other various sundries and daily necessaries.

What is claimed is:

1. A propylene-ethylene block copolymer characterized by the following (a), (b) and (c):
   (a) its melt flow rate (MFR) (at 230° C. under a load of 2.16 kg) falls between 0.01 and 1000 g/10 min;
   (b) the room-temperature xylene-insoluble component thereof, as measured through $^{13}$C-NMR, has a stereospecificity index [mmmm] fraction of not smaller than 98.9%; and
   (c) the room-temperature xylene-soluble component thereof is characterized by the following (c1), (c2) and (c3):

(c1) its amount falls between 3 and 50% by weight;

(c2) the T1 relaxation time component thereof, as measured through pulse NMR, is of a single relaxation component; and (c3) the ethylene content thereof, x % by weight, as measured through $^{13}$C-NMR, and the T1 relaxation time for it, y (milliseconds), as measured through pulse NMR, satisfy the following relational formula (I):

$$y \leq 0.0014x^3 - 0.0897x^2 - 1.0593x + 231.6 \quad (I).$$

2. The propylene-ethylene block copolymer as claimed in claim 1, of which the melt flow rate (MFR) (at 230° C. under a load of 2.16 kg) falls between 0.3 and 300 g/10 min.

3. The propylene-ethylene block copolymer as claimed in claim 2, which is produced through polymerization in the presence of a catalyst that comprises (A) a solid catalyst component formed from (a) a magnesium compound, (b) a titanium compound, (c) an electron donor, and optionally (d) a silicon compound, (B) an organoaluminium compound, and optionally (C) the third component of an electron-donating compound.

4. The propylene-ethylene block copolymer as claimed in claim 2, which is produced through polymerization in the presence of a catalyst that comprises (A) a solid catalyst component as prepared by contacting (a) a magnesium compound and (b) a titanium compound with each other in the presence of (c) an electron donor, at a temperature falling between 120 and 150° C., followed by washing them with an inert solvent at a temperature falling between 100 and 150° C., (B) an organoaluminium compound, and (C) the third component of an electron-donating compound.

5. The propylene-ethylene block copolymer as claimed in claim 2, which is produced through polymerization in the presence of a catalyst that comprises (A) a solid catalyst component as prepared by contacting (a) a magnesium compound and (b) a titanium compound with each other in the presence of (c) an electron donor and (d) a silicon compound, at a temperature falling between 120 and 150° C., followed by washing them with an inert solvent at a temperature falling between 100 and 150° C., (B) an organoaluminium compound, and (C) the third component of an electron-donating compound.

6. A propylene-ethylene block copolymer characterized by the following (a), (b) and (c'):

(a) its melt flow rate (MFR) (at 230° C. under a load of 2.16 kg) falls between 0.01 and 1000 g/10 min;

(b) the room-temperature xylene-insoluble component thereof, as measured through $^{13}$C-NMR, has a stereospecificity index [mmmm] fraction of not smaller than 98.9%; and (c') the room-temperature xylene-soluble component thereof is characterized by the following (c1) and (c4):

(c1) its amount falls between 3 and 50% by weight; and (c4) the ethylene content thereof, x % by weight, as measured through $^{13}$C-NMR, and the ratio by weight of the crystalline polyethylene segments to the total of the ethylene-propylene copolymer segments and the crystalline polyethylene segments, z (%), as obtained from the TEM (transmission electron microscope) image of the propylene-ethylene block copolymer, satisfy the following relational formula (II):

$$z \leq 0.016x^2 - 0.069x - 1.34 \quad (II).$$

7. The propylene-ethylene block copolymer as claimed in claim 6, of which the melt flow rate (MFR) (at 230° C. under a load of 2.16 kg) falls between 0.3 and 300 g/10 min.

8. The propylene-ethylene block copolymer as claimed in claim 7, which is produced through polymerization in the presence of a catalyst that comprises (A) a solid catalyst component formed from (a) a magnesium compound, (b) a titanium compound, (c) an electron donor, and optionally (d) a silicon compound, (B) an organoaluminium compound, and optionally (C) a third component of an electron-donating compound.

9. The propylene-ethylene block copolymer as claimed in claim 7, which is produced through polymerization in the presence of a catalyst that comprises (A) a solid catalyst component as prepared by contacting (a) a magnesium compound and (b) a titanium compound with each other in the presence of (c) an electron donor, at a temperature falling between 120 and 150° C., followed by washing them with an inert solvent at a temperature falling between 100 and 150° C., (B) an organoaluminium compound, and (C) a third component of an electron-donating compound.

10. The propylene-ethylene block copolymer as claimed in claim 7, which is produced through polymerization in the presence of a catalyst that comprises (A) a solid catalyst component as prepared by contacting (a) a magnesium compound and (b) a titanium compound with each other in the presence of (c) an electron donor and (d) a silicon compound, at a temperature falling between 120 and 150° C., followed by washing them with an inert solvent at a temperature falling between 100 and 150° C., (B) an organoaluminium compound, and (C) a third component of an electron-donating compound.

\* \* \* \* \*